(12) United States Patent
Hashimoto et al.

(10) Patent No.: US 7,063,014 B2
(45) Date of Patent: Jun. 20, 2006

(54) PHOTOGRAVURE PRESS AND METHOD FOR MANUFACTURING MULTILAYER-CERAMIC ELECTRONIC COMPONENT

(75) Inventors: Akira Hashimoto, Takefu (JP); Hiroyoshi Takashima, Sabae (JP); Yoshihiro Kanayama, Takefu (JP); Kazuhiro Tabata, Sabae (JP); Takahiro Nishizawa, Sabae (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/826,236

(22) Filed: Apr. 16, 2004

(65) Prior Publication Data

US 2004/0221755 A1    Nov. 11, 2004

(30) Foreign Application Priority Data

Apr. 17, 2003  (JP)  ............................. 2003-112450
Apr. 2, 2004   (JP)  ............................. 2004-109704

(51) Int. Cl.
*B41F 9/00*  (2006.01)

(52) U.S. Cl. ...................... 101/150; 101/395
(58) Field of Classification Search ............... 101/150, 101/152, 153, 154, 161, 165, 170, 395, 401.1; 430/307, 310, 396
See application file for complete search history.

(56) References Cited

U.S. PATENT DOCUMENTS

| | | | |
|---|---|---|---|
| 3,507,729 A * | 4/1970 | Miller | ............... 156/209 |
| 4,819,558 A | 4/1989 | Counard | |
| 5,033,377 A * | 7/1991 | Shimizu | ............... 101/150 |
| 5,671,678 A | 9/1997 | Bolte et al. | |
| 6,680,092 B1 | 1/2004 | Levy | |
| 6,701,839 B1 | 3/2004 | Levy | |
| 6,731,405 B1 | 5/2004 | Samworth | |
| 2003/0111158 A1 | 6/2003 | Okuyama | |

FOREIGN PATENT DOCUMENTS

| | | |
|---|---|---|
| JP | 03-108307 | 5/1991 |
| JP | 5-41015 | 10/1993 |
| JP | 06-316174 | 11/1994 |
| JP | 09-076459 | 3/1997 |
| JP | 2003-059750 | 2/2003 |
| JP | 2003-086451 | 3/2003 |

OTHER PUBLICATIONS

Official Communication Issued in the corresponding Taiwanese Application No. 093110741, Aug. 1, 2005.

\* cited by examiner

*Primary Examiner*—Andrew H. Hirshfeld
(74) *Attorney, Agent, or Firm*—Keating & Bennett, LLP

(57) ABSTRACT

A photogravure printing press includes plurality of cells defined by printing-direction walls and substantially perpendicular walls formed in each of image areas on the circumferential surface of a gravure roll. A plurality of substantially perpendicular cuts are formed in each of the substantially perpendicular walls. In the central portion of the image area, each of the substantially perpendicular cuts is formed so as to have a gap greater than the width of each of the printing-direction walls and the substantially perpendicular walls.

17 Claims, 11 Drawing Sheets

PHOTOGRAVURE PRESS AND METHOD FOR MANUFACTURING MULTILAYER-CERAMIC ELECTRONIC COMPONENT

BACKGROUND OF THE INVENTION

1. Field of the Invention

The present invention relates to a photogravure press used for manufacturing a multilayer-ceramic electronic component and a method for manufacturing a multilayer-ceramic electronic component, conducted by using the photogravure press, and in particular, the present invention relates to a technique for improving smoothness of a paste film formed by gravure printing.

2. Description of the Related Art

In order to manufacture a multilayer-ceramic electronic component such as a multilayer ceramic capacitor, for example, a step of forming a conductive paste film functioning as an internal electrode on a ceramic green sheet is executed. The internal electrode defined by the conductive paste film is required to have high patterning accuracy. As a technique for satisfying the above requirement, gravure printing has attracted attention (for example, see Japanese Unexamined Patent Application Publication No. 9-76459 (hereinafter, referred to as Patent Document 1)).

Patent Document 1 discloses an apparatus for manufacturing an electronic component, in which, in order to make uniform the thickness of the peripheral portion of the paste film formed by gravure printing, of a plurality of cells formed in each of image areas which have print paste applied thereon and which are formed on the circumference surface of a gravure roll, a portion of the cells lying in the peripheral portion of the image area are formed so as to have open areas that are smaller than those of another portion of the cells lying in the central portion of the image area, and the depths of the cells lying in the peripheral portion are made smaller than those of the cells lying in the central portion.

Unfortunately, in the apparatus disclosed in Patent Document 1, since the cells formed in the image area are independent from each other, the ratio of the area of the cells with respect to the overall area of the image area is relatively small, and also, since print paste between the adjacent cells is unlikely to flow during printing, the apparatus is not suitable for forming a paste film especially having a relatively large area and often causes unevenness of printing.

As a technique for solving the above-described problems, for example, Japanese Examined Utility Model Registration Application Publication No. 5-41015 (hereinafter, referred to as Patent Document 2) has proposed a photogravure plate, although not intended to be applied to electronic components, in which walls defining a plurality of cells in an image area are arranged so as to extend at an angle with the printing direction and have cuts so as to allow the adjacent cells to communicate with each other.

According to the technique set forth in Patent Document 2, the ratio of the area of a region (that is, the cells and the cuts) in which the print paste can be held can be increased with respect to the overall area of the image area, and also, it can be expected that the print paste flows through the cuts.

Unfortunately, according to the technique set forth in Patent Document 2, since the gap of each cut is formed smaller than the width of each wall, when print paste, such as conductive paste, having a relatively high viscosity is used, the print paste is limited to flow between the adjacent cells, thereby sometimes causing a printed paste film to have a trace of the cell or forming a rough paste film.

Also, according to the technique set forth in Patent Document 2, since the walls defining the plurality of cells formed in the image area are arranged so as to extend at an angle with the printing direction, so-called stringiness of the print paste occurs at an angle with the circumferential surface of the gravure roll when a substrate sheet is detached from the gravure roll, whereby local irregularities are likely to occur in the peripheral portion of the printed paste film. Inconstancy in the direction of the stringiness causes reciprocal overlapping, which leads further to variation in the thickness of paste films.

SUMMARY OF THE INVENTION

In order to overcome the problems described above, preferred embodiments of the present invention provide a photogravure press used for manufacturing a multilayer-ceramic electronic component and a method for manufacturing a multilayer-ceramic electronic component performed by using the photogravure press.

The present invention is first directed to a photogravure press used for manufacturing a multilayer-ceramic electronic component, with which paste films to be patterned layers defining part of a laminate to be provided in the multilayer-ceramic electronic component are formed on a substrate sheet by gravure printing.

The photogravure press includes a gravure roll having image areas formed on the circumferential surface thereof and having print paste applied thereon so as to provide the paste films, and an impression cylinder facing the gravure roll having the substrate sheet sandwiched therebetween. In each image area, a plurality of printing-direction walls extending in the printing direction and a plurality of substantially perpendicular walls extending substantially perpendicularly to the printing-direction walls are disposed, and a plurality of cells defined by the printing-direction walls and the substantially perpendicular walls is formed.

In order to solve the foregoing problems, the photogravure press having the above structure is constructed as follows.

That is, in order for the adjacent cells to lie in communication with each other, each of the substantially perpendicular walls has a plurality of substantially perpendicular cuts formed therein so that the substantially perpendicular wall extends intermittently, having the substantially perpendicular cuts interposed therein. In addition, in the central portion of the image area, each of the substantially perpendicular cuts is formed so as to have a gap greater than the width of each of the printing-direction walls and the substantially perpendicular walls. With this structure, even when print paste having a relatively high viscosity is used, the print paste can flow smoothly between the adjacent cells, thereby resulting in a uniform thickness of each paste film formed by gravure printing.

In a first modification of the photogravure press according to preferred embodiments of the present invention, a portion of the plurality cells lying in the peripheral portion of the image area are formed so as to have smaller open areas than those of another portion of the plurality of cells lying in the central portion of the image area. With the above-described structure of the photogravure press of a preferred embodiment of the present invention, a so-called "saddle phenomenon" is prevented from occurring. The "saddle phenomenon", meaning that the paste film is a peripheral portion thicker than its central portion, is generally likely to occur when gravure printing is applied for forming a paste film. In the event a multilayer ceramic electronic component is manufactured by using a conductive paste film having such a "saddle phenomenon" occurred therein, sometimes a short circuit or a structural defect occurs.

In the first modification, each of the printing-direction walls extends continuously in the image area, two kinds of the substantially perpendicular walls are alternately disposed in the printing direction such that one lies in contact with any one of the printing-direction walls and the other lies in contact with the above printing-direction wall, having the corresponding substantially perpendicular cut interposed therebetween, and each cell has the substantially perpendicular cuts at its two corners diagonally opposed to each other. With this structure, local irregularities are prevented from occurring in the peripheral portion of each paste film formed by gravure printing, and the smoothness of the paste film is further improved.

In the first modification, at least one start-edge groove extending substantially perpendicularly to the printing direction is preferably disposed on the printing-start side of the image area so as to be independent of the cells. With this structure, slight touching or deficiency in thickness of the corresponding paste film is prevented from occurring on its printing-start side.

Also, in the first modification, it is preferable that the outermost ones of the printing-direction walls have no substantially perpendicular cuts formed outside thereof.

In a second modification of the photogravure press according to preferred embodiments of the present invention, each of the printing-direction walls has a plurality of printing-direction cuts formed therein so that the substantially perpendicular wall extends intermittently, having the printing-direction cuts interposed therein. Also, the printing-direction walls are disposed so as to intersect with the substantially perpendicular cuts, the substantially perpendicular walls are disposed so as to intersect with the printing-direction cuts, and either one of the substantially perpendicular cuts and the printing-direction cuts is disposed at each corner of each of the cells.

In the second modification, a portion of the cells lying on the printing-start side and another portion lying on the printing-end side of the image area are preferably formed so as to have the same open area as each other.

In the photogravure press according to preferred embodiments of the present invention, it is preferable that the image area have an outline groove formed therein, having a constant width and defining at least a portion of the outline thereof. With this structure, the linearity of the peripheral outline of the corresponding paste film formed by gravure printing can be improved.

Also, all of the plurality of cells are preferably substantially identical in depth. With this structure, since the thickness of the corresponding paste film formed by gravure printing is affected by the open areas of the cells, the thickness of the paste film can be easily controlled by the open areas of the cells.

In addition, the length of the image area extending in the circumferential direction of the gravure roll is preferably formed smaller than a nip width provided by the gravure roll and the impression cylinder. With this structure, since the entire image area can be in contact with a substrate sheet in the printing step, print paste can be uniformly transferred onto the substrate sheet, whereby slight touching due to an insufficient transfer amount of the print paste is unlikely to occur in the substrate sheet.

The present invention is also directed to a method for manufacturing a multilayer-ceramic electronic component, conducted by using the photogravure press of the preferred embodiments of the present invention described above. With the above application of the photogravure press, the characteristics of the obtained multilayer-ceramic electronic components can be stabilized, the occurrence of defective products can be reliably prevented, and the manufacturing yield can be greatly improved.

In the method for manufacturing a multilayer-ceramic electronic component according to the present invention, gravure printing is preferably used for forming conductive paste films to define internal electrodes. That is, it is preferable that conductive paste be used so as to serve as the print paste, and that the paste film formed by the print paste be a conductive paste film to define an internal electrode. With this arrangement, the thickness of the conductive paste films can be made uniform, thereby preventing a short circuit and faulty insulation from occurring in the obtained multilayer-ceramic electronic component.

In the above case, the substrate sheet is preferably a ceramic green sheet.

Other features, elements, characteristics, steps and advantages of the present invention will become more apparent form the following detailed description of preferred embodiments with reference to the attached drawings.

DETAILED DESCRIPTION OF PREFERRED EMBODIMENTS

Figure 1:
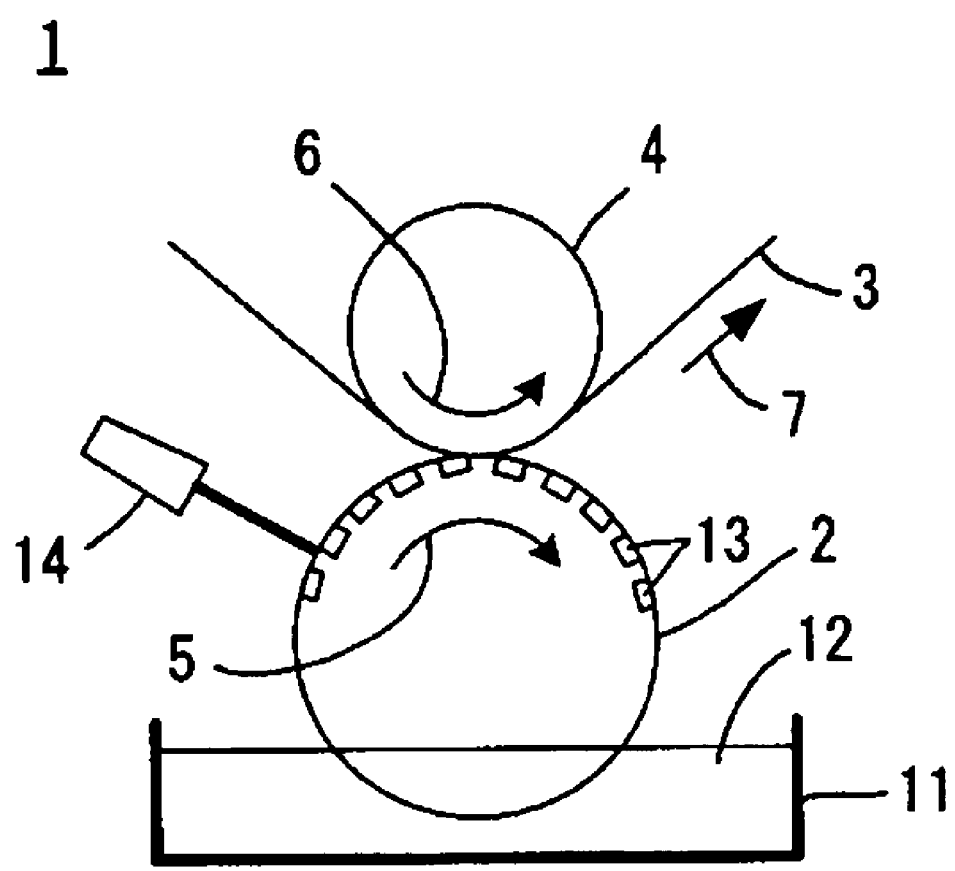
FIG. 1 is an elevation view schematically illustrating a photogravure press according to a first preferred embodiment of the present invention.

FIG. 1 is an elevation view schematically illustrating a photogravure press 1 according to a first preferred embodiment of the present invention.

The photogravure press 1 includes a gravure roll 2 and an impression cylinder 4 facing the gravure roll 2, having a substrate sheet 3 sandwiched therebetween. The gravure roll 2 and the impression cylinder 4 rotate respectively in the directions of arrows 5 and 6 so as to transport the substrate sheet 3 in the direction of an arrow 7.

The photogravure press 1 is used for manufacturing a multilayer-ceramic electronic component such as a multilayer-ceramic capacitor. More particularly, the photogravure press 1 is used for forming paste films on the substrate sheet 3 by gravure printing, to be patterned layers defining part of a laminate to be provided in the multilayer-ceramic electronic component. To be more specific, as shown in FIG. 2, conductive paste films 9 to be patterned internal electrodes are formed on a ceramic green sheet 8 by gravure printing.

Figure 2:
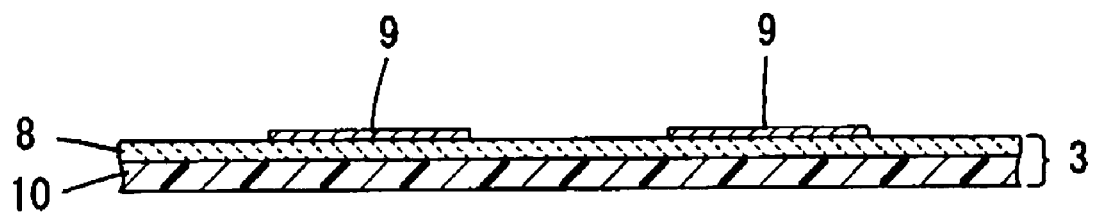
FIG. 2 is a sectional view of a substrate sheet, illustrating a state in which conductive films are formed on a ceramic green sheet lined with a carrier film by the photogravure press shown in FIG. 1.

As shown in FIG. 2, the ceramic green sheet 8 is lined with a carrier film 10. Thus, the substrate sheet 3 shown in FIG. 1 is formed by the ceramic green sheet 8 lined with the carrier film 10 as mentioned above.

As shown in FIG. 1, the gravure roll 2 is immersed in conductive paste 12 contained in a tank 11 so as to apply the conductive paste 12 on a plurality of image areas 13 (a portion of them are schematically illustrated in the figure) formed on the circumferential surface of the gravure roll 2. The image areas 13 will be described in detail later. An excess portion of the conductive paste 12 on the circumferential surface of the gravure roll 2 is scraped off by a doctor blade 14.

Figure 3:
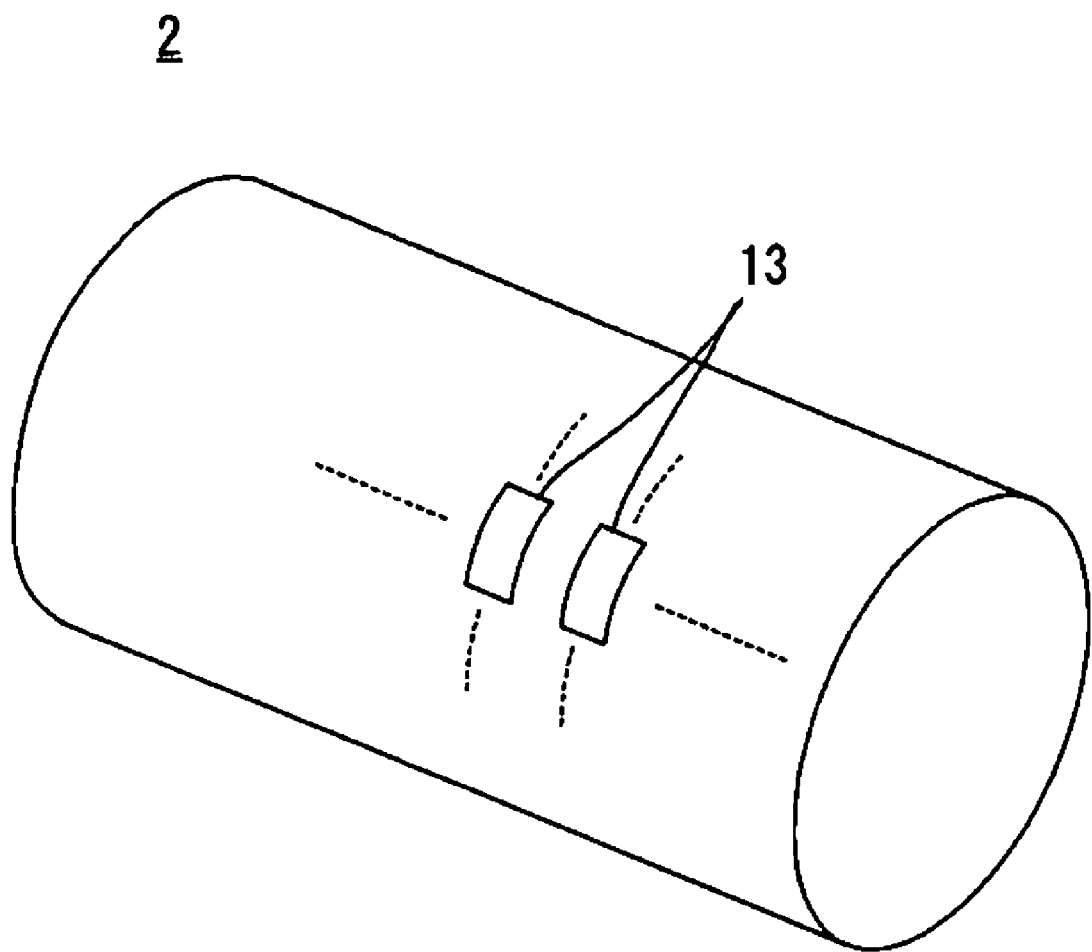
FIG. 3 is a perspective view of a gravure roll alone shown in FIG. 1.

The image areas 13 have patterns corresponding to those of the conductive paste films 9 shown in FIG. 2 although only representative examples of them are schematically illustrated in FIG. 3. In the present preferred embodiment, the longitudinal direction of the image areas 13 is arranged so as to lie in the circumferential direction of the gravure roll 2.

Figure 4:
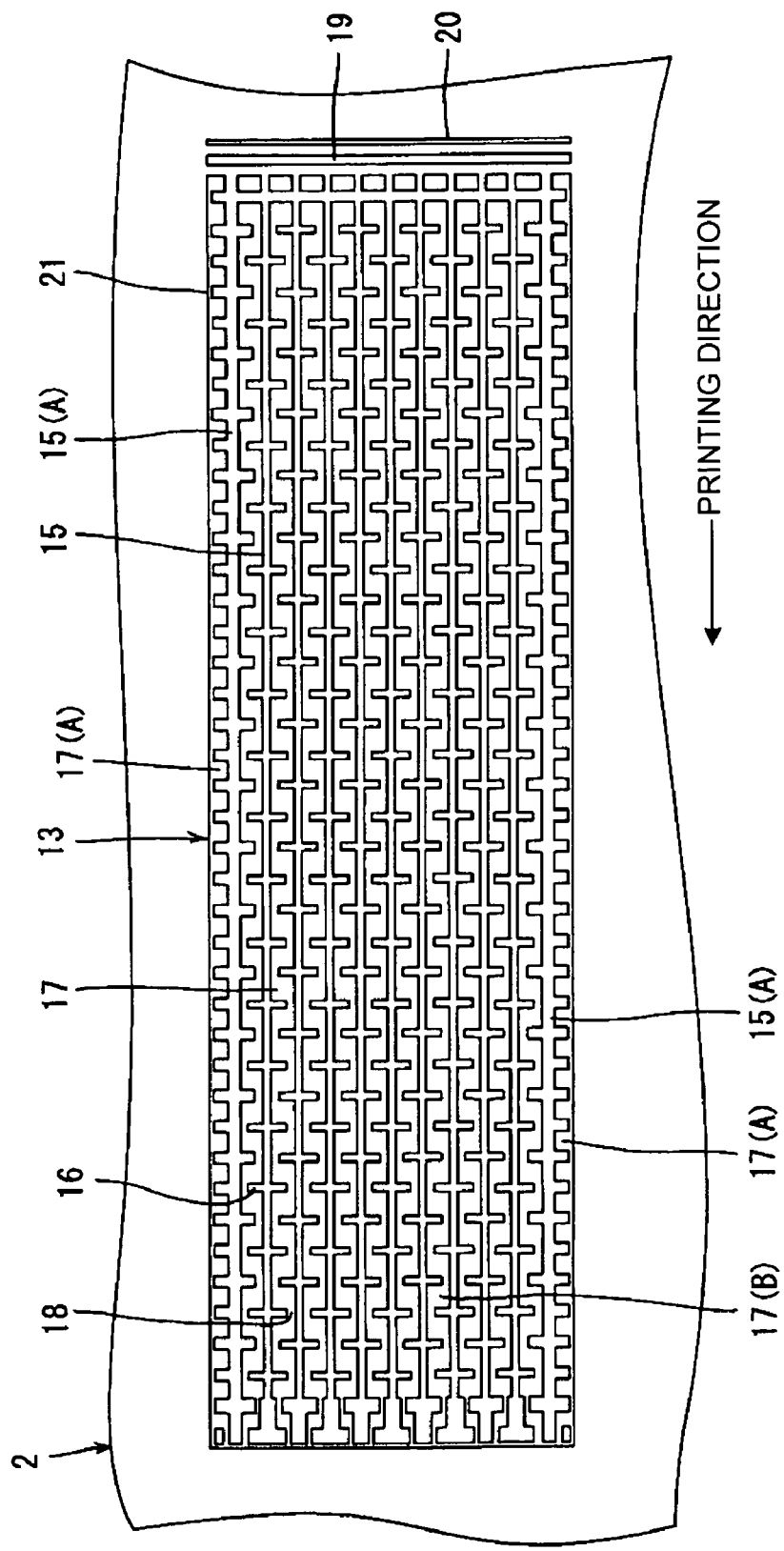
FIG. 4 is a development of the circumferential surface of the gravure roll, illustrating a magnification of one of image areas shown in FIG. 3.

FIG. 4 is a development of the circumferential surface of the gravure roll 12, illustrating a magnification of one of the image areas 13. The printing direction indicated by the arrow in FIG. 4 corresponds to the arrow 5 indicated in FIG. 1. To be further in detail, the far-right side and the far-left side of the image area 13 in FIG. 4 define a printing-start side and a printing-end side, respectively. Thus, in the printing process, a region of the image areas 13 coming into contact with the substrate sheet 3 is shifted from the far-right side to the far-left side shown in FIG. 4.

The image area 13 has a plurality of printing-direction walls 15 extending in the printing direction and a plurality of substantially perpendicular walls 16 extending in a direction that is substantially perpendicular to the printing-direction walls 15 and thus has a plurality of cells 17 formed therein, defined by the printing-direction walls 15 and the substantially perpendicular walls.

When respective open areas of the plurality of cells 17 are viewed, cells 17(A) lying in the peripheral portion of the image area 13 are formed so as to have smaller open areas than those of cells 17(B) lying in the central portion of the image area 13. In order to make the open areas of the cells 17(A) lying in the peripheral portion smaller, each of the printing-direction walls 15 and the substantially perpendicular walls 16 lying in the peripheral portion of the image area 13 is formed so as to have a greater width than that of those lying in the other portion. With this structure, the "saddle phenomenon" described in the Description of the Related Art is prevented from occurring.

Also, in order for the adjacent cells 17 to lie in communication with each other, each of the substantially perpendicular walls 16 has a plurality of substantially perpendicular cuts 18 formed therein so that the substantially perpendicular wall extends intermittently, having the substantially perpendicular cuts 18 interposed therein.

In addition, each of the printing-direction walls 15 extends continuously in the image area 13. Two kinds of the substantially perpendicular walls 16 are alternately disposed in the printing direction such that one lies in contact with any one of the printing-direction walls 15, and the other lies in contact with the above printing-direction wall 15, having the corresponding substantially perpendicular cut 18 interposed therebetween. As a result, each cell 17 has the substantially perpendicular cuts 18 at its two corners diagonally opposed to each other.

With the foregoing structure, the conductive paste 12 (see FIG. 1) flows not only smoothly between the adjacent cells 17 but also uniformly in the printing direction, thereby preventing so-called stringiness of the conductive paste 12, which would otherwise occur when the substrate sheet 3 is detached from the gravure roll 2, from occurring at an angle with the circumferential surface of the gravure roll 2, and thus preventing local irregularities from occurring in the peripheral portion of each of the printed conductive paste films 9 (see FIG. 2).

On the contrary, as a comparative example, when the printing-direction walls 15 are formed so as to extend intermittently, and the substantially perpendicular walls 16 are formed so as to extend continuously, it has been confirmed that the conductive paste film 9 has relatively large irregularities in thickness.

Figure 5:
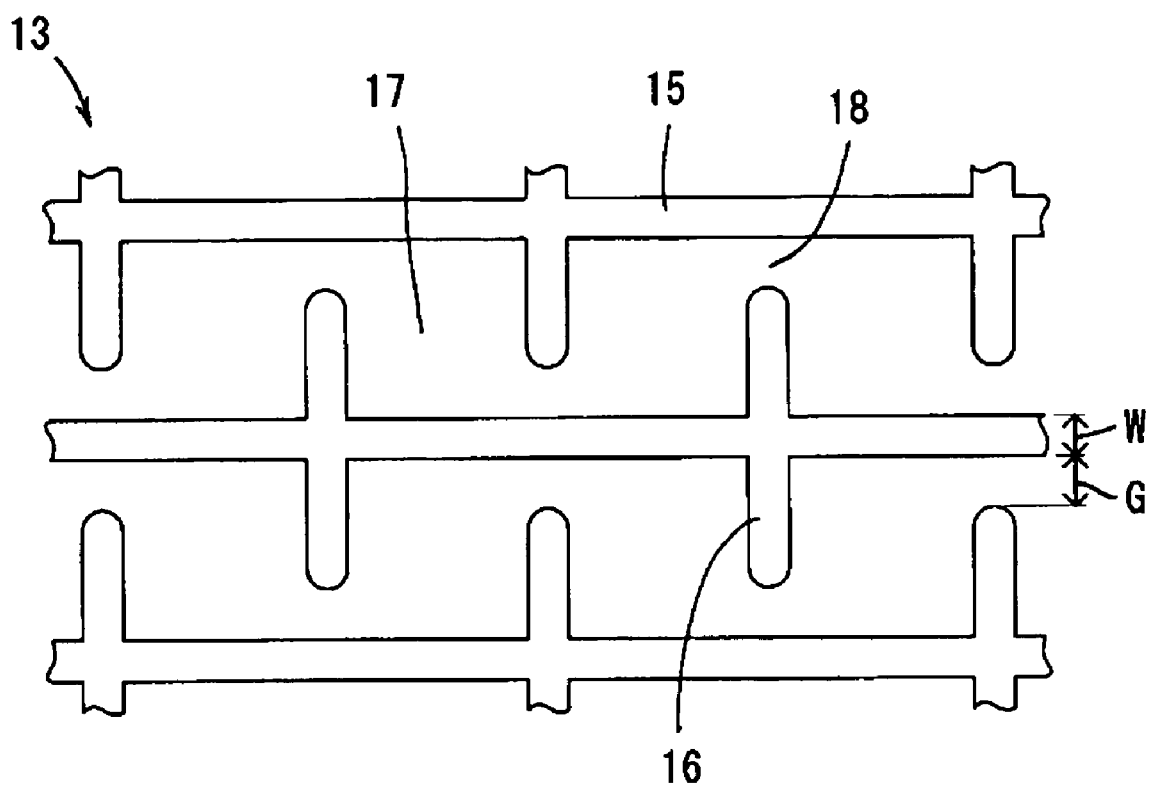
FIG. 5 is a further magnification of a portion of the image area shown in FIG. 4.

FIG. 5 is a further magnification of a central region of the image area 13 shown in FIG. 4. As shown in FIG. 5, in the central portion of the image area 13, the gap G of each of the substantially perpendicular cuts 18 is greater than the width W of each of the printing-direction walls 15 and the substantially perpendicular walls 16. For example, the gap G is formed in the range from about 20 μm to about 40 μm while the width W is formed in the range from about 5 μm to about 20 μm.

With this structure, even when the conductive paste 12 having an example viscosity of about 0.1 Pa·s to about 40 Pa·s higher than that of general gravure ink is used, a constant flow is smoothly generated in the printing direction, thereby reliably providing a uniform thickness in each of the conductive paste films 9. Although the printing-direction walls 15 and the substantially perpendicular walls 16 preferably have the same width W as each other in the present preferred embodiment shown in the figure, the walls 15 and 16 may have different widths from each other.

Referring again to FIG. 4, the image area 13 has at least one start-edge groove, two start-edge grooves 19 and 20 in the present preferred embodiment, extending substantially perpendicularly to the printing direction and disposed on the printing-start side so as to be independent of the cells 17. These start-edge grooves 19 and 20 are formed so as to have respective constant widths and depths. With the presence of such start-edge grooves 19 and 20, slight touching or deficiency in thickness of the conductive paste film 9 is unlikely to occur on the printing-start side.

The image area 13 also has an outline groove 21 formed therein, defining at least a portion of the outline thereof and having a constant width. Meanwhile, the outline groove 21 may have different widths in the printing direction and the perpendicular direction from each other. In the present preferred embodiment, the outline groove 21 has a constant depth and is formed along three sides of the image area 13 other than a side on the printing-start side of the same. With this structure, linearity of the outline of the conductive paste film 9 can be improved.

Each of outermost printing-direction walls 15(A) of the printing-direction walls 15 has no substantially perpendicular cuts 18 formed outside thereof. Such a structure contributes to improving the foregoing linearity of the edges of the conductive paste film 9, especially its edges extending in the printing direction.

Although, as described above, the cells 17(A) lying in the peripheral portion are formed so as to have smaller open areas than those of the cells 17(B) lying in the central portion with respect to the respective open areas of the cells 17, all of the cells 17 are formed so as to be substantially identical in depth regardless of the sizes of their open areas. Accordingly, the thickness of the conductive paste film 9 is affected by the open areas of the cells 17, whereby the thickness of the conductive paste film 9 can be easily controlled.

Figure 6:
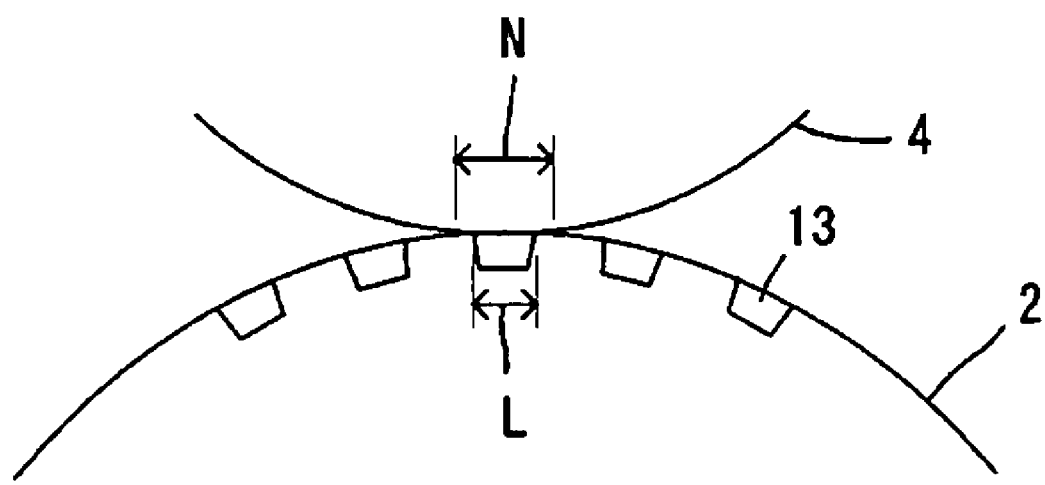
FIG. 6 is an elevation view, illustrating portions of the gravure roll and an impression cylinder shown in FIG. 1.

FIG. 6 is an elevation view of portions of the gravure roll 2 and the impression cylinder 4, schematically illustrating a portion of the image areas 13.

The gravure roll 2 and the impression cylinder 4 have the substrate sheet 3 (see FIG. 1) sandwiched therebetween and rotates respectively while exerting a pressure on each other so as to transport the substrate sheet 3. Since the impression cylinder 4 is generally composed of an elastic material, the gravure roll 2 and the impression cylinder 4 provide a predetermined nip width N. Accordingly, the conductive paste 12 applied on each image area 13 of the gravure roll 2 is transferred onto the substrate sheet 3 within the range defined by the nip width N.

In the present preferred embodiment, the length L of the image area 13 extending in the circumferential direction of the gravure roll 2 is smaller than the nip width N. With this arrangement, since the entire image area 13 comes into contact with the substrate sheet 3, and then the substrate sheet 3 is detached from the gravure roll 2 during printing, the conductive paste 12 does not flow rearwards from the print end of the image area 13, thereby uniformly transferring the conductive paste 12 onto the substrate sheet 3, as a result, advantageously preventing slight touching due to an insufficient transfer amount of the conductive paste 12 from occurring in the conductive paste film 9.

Especially, in the case where the printing-direction walls 15 extend continuously in the corresponding image area 13 as in the present preferred embodiment, the conductive paste 12 flows in the printing direction only in the regions surrounded by the printing-direction walls 15, thereby effectively preventing occurrence of irregularities on the surface of the conductive paste film 9.

When the conductive paste film 9 is formed by the photogravure press 1 having the above-described structure, its entire surface can be made smooth and excellent linearity of its peripheral outline can be achieved.

When the ceramic green sheet 8 having the conductive paste films 9 as shown in FIG. 2 formed thereon is obtained by using the photogravure press 1, a plurality of the ceramic green sheets 8 is laminated, crimped, cut if necessary, and then fired so as to provide a laminate to be the main body of a multilayer-ceramic electronic component. The foregoing conductive paste films 9 define internal electrodes in the laminate. Then, by forming an external electrode or the like on the outer surface of the laminate if needed, a desired multilayer-ceramic electronic component is completed.

In such a multilayer-ceramic electronic component, since the entire conductive paste film 9 is smoothly formed as described above, a stress is not locally concentrated in the crimping step, thereby preventing a short circuit through a ceramic layer caused by mutual contact of the internal electrodes and faulty insulation due to a local small thickness of the ceramic layer.

Figure 7:
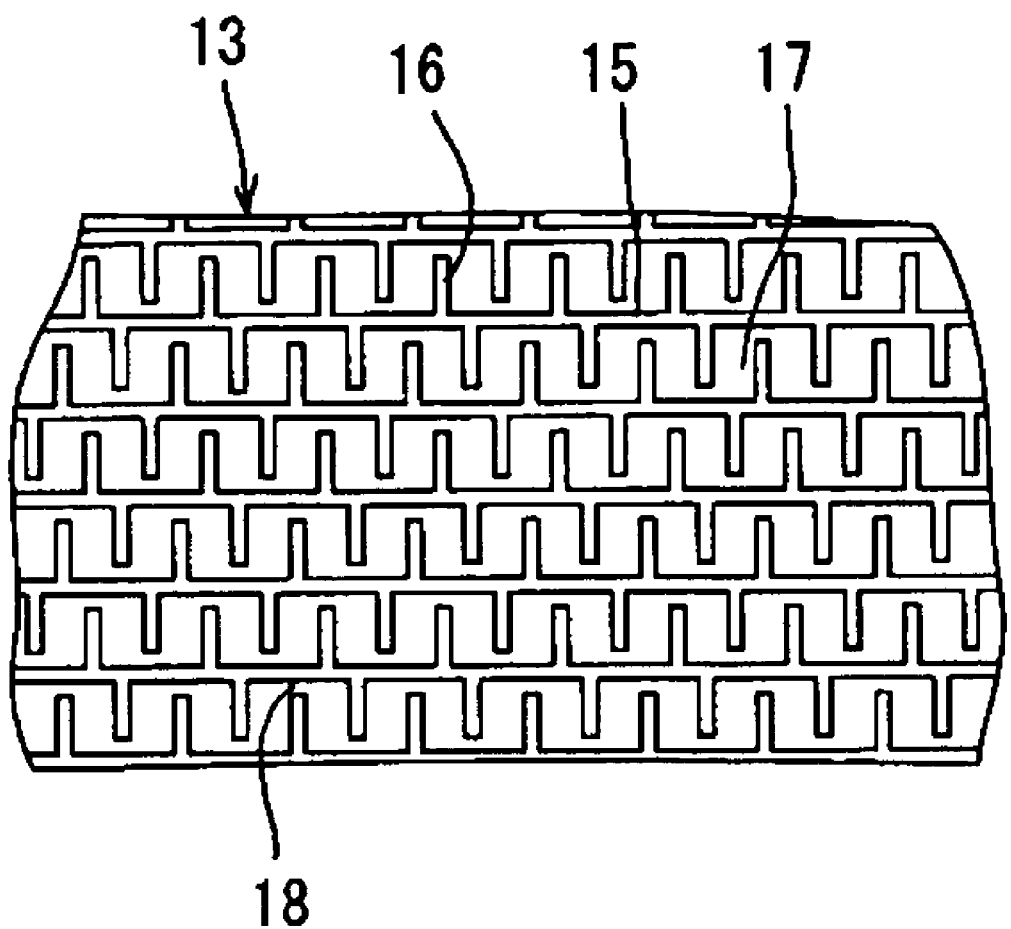
FIG. 7 is a partial view of an image area according to a second preferred embodiment of the present invention, corresponding to a portion of the image area shown in FIG. 4.
Figure 8:
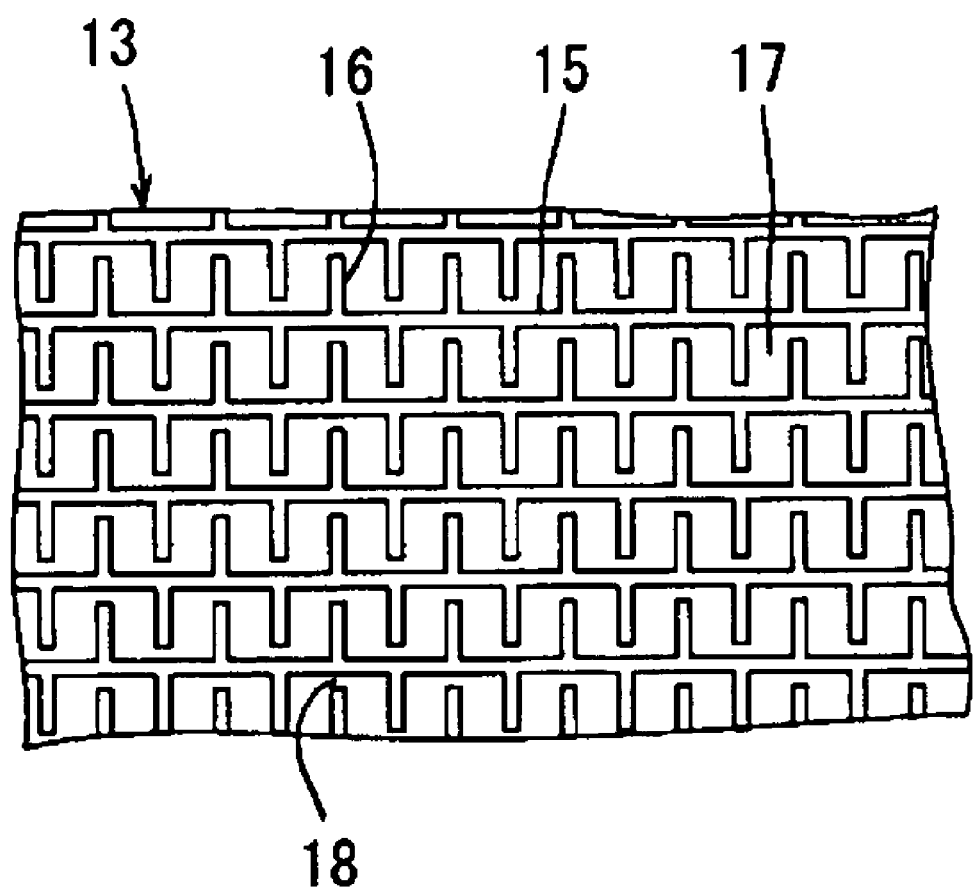
FIG. 8 is a partial view of an image area according to a third preferred embodiment of the present invention, corresponding to a portion of the image area shown in FIG. 4.

FIGS. 7 and 8 respectively illustrate second and third preferred embodiments of the present invention, corresponding to a portion of the view of FIG. 4. In FIGS. 7 and 8, elements corresponding to those shown in FIG. 4 are denoted by the same reference numerals, and their repetitive description will be omitted.

In each of the preferred embodiments shown in FIGS. 7 and 8, the positional relationship of the substantially perpendicular walls 16 with the printing-direction walls 15 has been modified. Nevertheless, in the same fashion as in the first preferred embodiment, the present preferred embodiment has a feature in that each of the printing-direction walls 15 extends substantially continuously in the corresponding image area 13, two kinds of the substantially perpendicular walls 16 are alternately disposed in the printing direction such that one lies in contact with any one of the printing-direction walls 15, and the other lies in contact with the above printing-direction wall 15, having the corresponding substantially perpendicular cut 18 interposed therebetween, and each cell 17 has the substantially perpendicular cuts 18 at its two corners diagonally opposed to each other.

Figure 9:
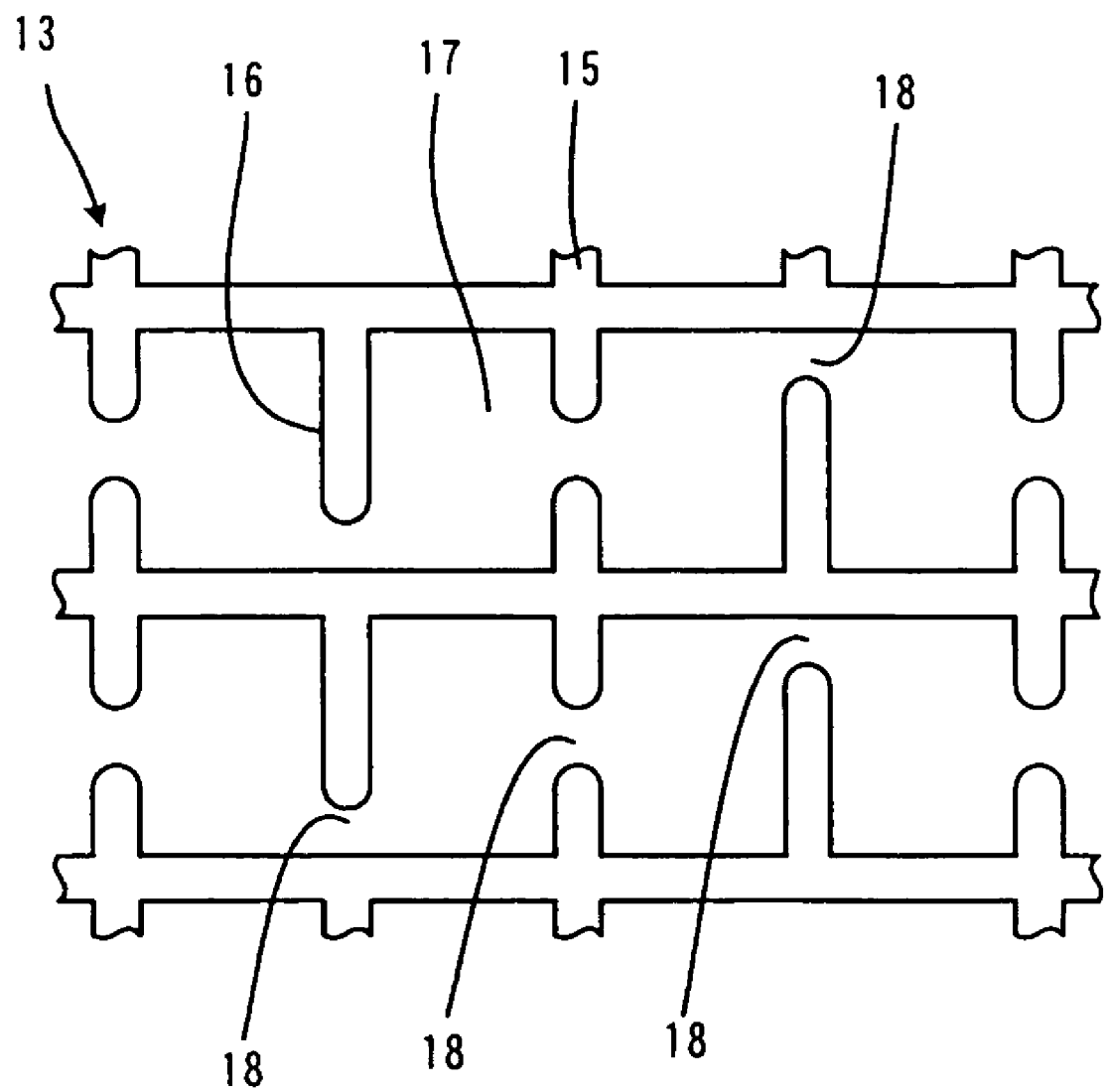
FIG. 9 is a partial view of an image area according to a fourth preferred embodiment of the present invention, corresponding to a portion of the image are area shown in FIG. 5.

FIGS. 9 illustrates a fourth preferred embodiment of the present invention, respectively corresponding to FIG. 5. In FIG. 9, elements corresponding to those shown in FIG. 5 are denoted by the same reference numbers, and their repetitive description will be omitted.

In the preferred embodiment shown in FIG. 9, as is in the second and third preferred embodiments, the positional relationship of the substantially perpendicular walls 16 with the printing-direction walls 15 has been modified compared with the first preferred embodiment. Nevertheless, in the same fashion as in any one of the first to the third preferred embodiments, the present preferred embodiment has a feature in that each of the printing-direction walls 15 extends substantially continuously in the corresponding image area 13.

Furthermore, each one of the first to the fourth preferred embodiments as described above, has a common feature in that the perpendicular cuts 18, which are adjacent to each other in the printing direction, take different positions from each other in the perpendicular direction with respect to the printing direction.

The foregoing structure effectively prevents a partial thinning of the conductive paste 12 (see FIG. 2) due to undesirable scrape of even the conductive paste 12 which should remain within the each cell 17 when an excess portion of the conductive paste 12 on the circumferential surface of the gravure roll 2 is scraped off by a doctor blade 14 as shown in FIG. 1.

Also, the stringiness of the conductive paste 12 which occurs when the ceramic green sheet 8 is detached from the gravure roll 2, proceeds continuously through the perpendicular cuts 18. Therefore, an above-described misalignment of the positions of the perpendicular cuts 18 which are adjacent to each other, in the perpendicular direction with respect to the printing direction, effectively prevents occurrence of irregularities on the surface of the conductive paste film 9 which may be caused by the stringiness of the conductive paste 12.

Figure 10:
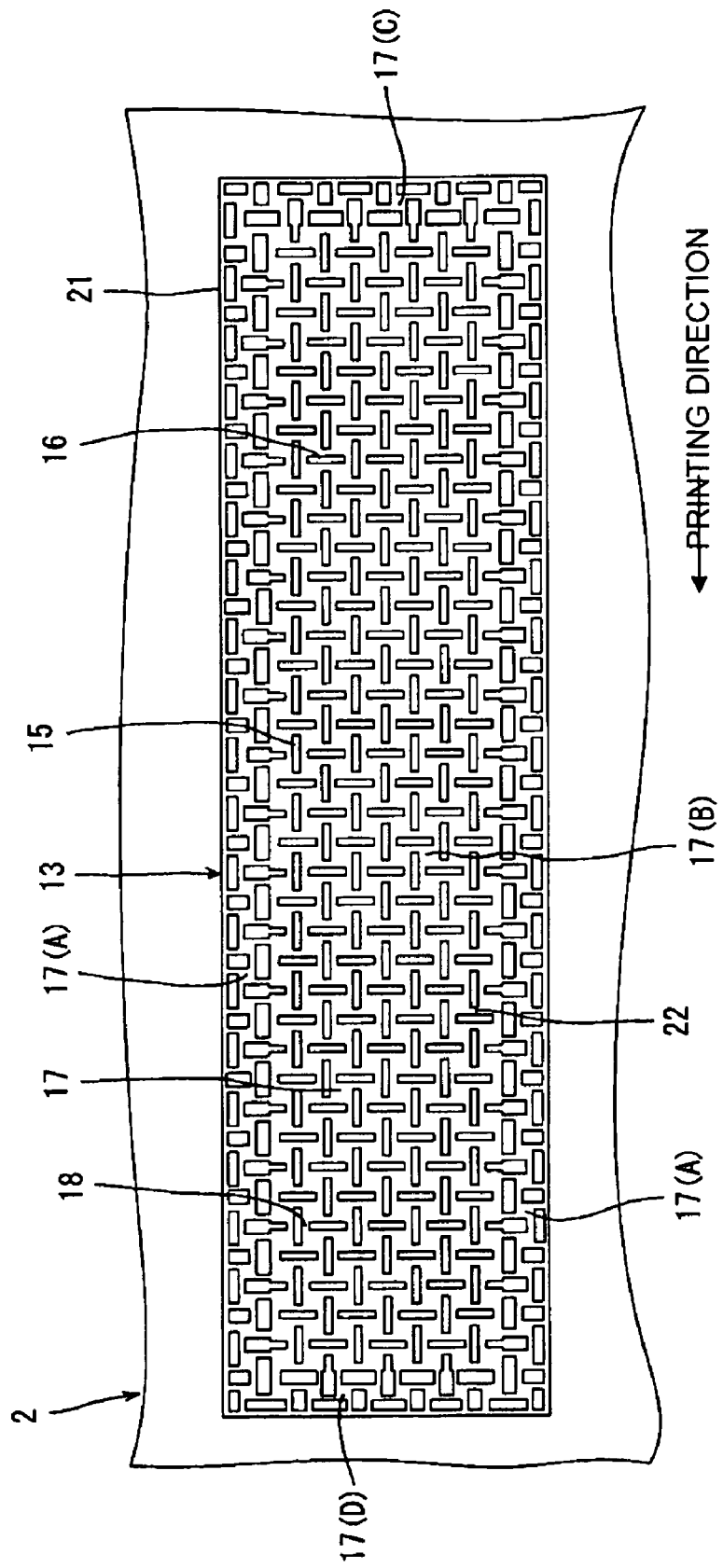
FIG. 10 is a partial view of an image area according to a fifth preferred embodiment of the present invention, corresponding to a portion of the image area shown in FIG. 4.
Figure 11:
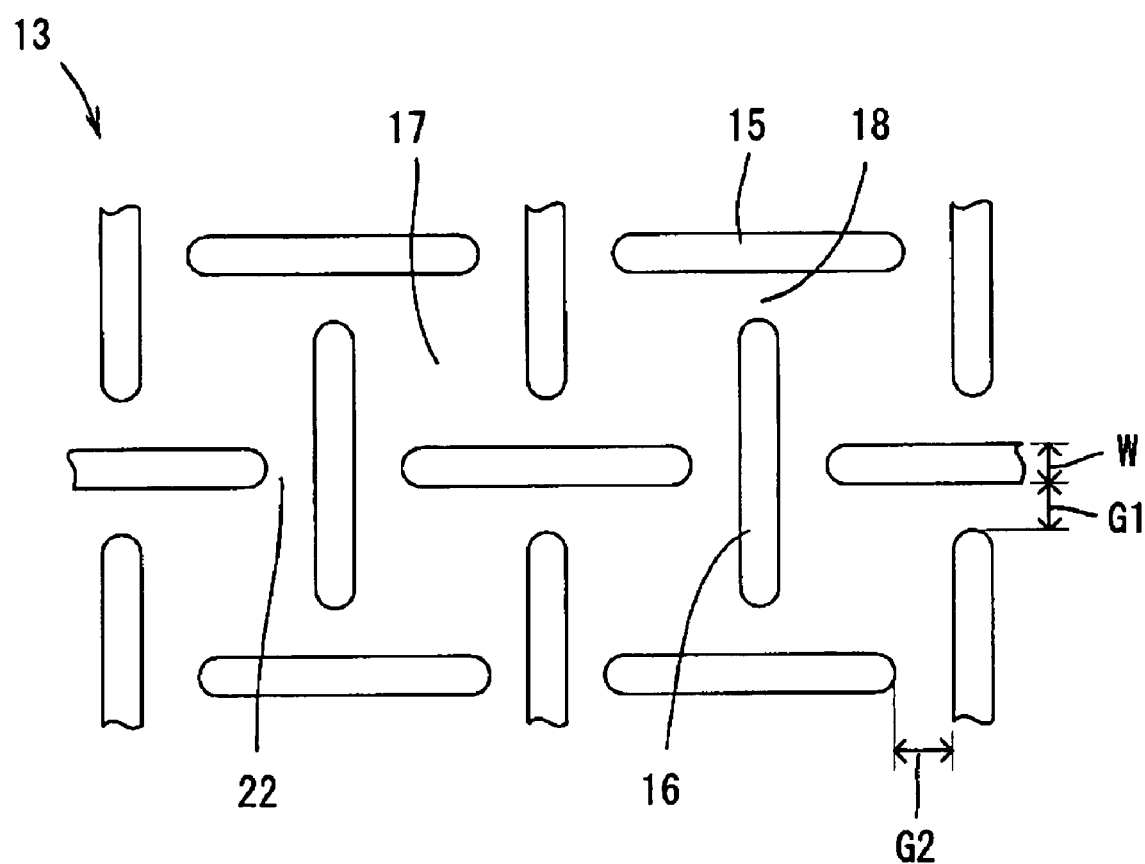
FIG. 11 is a further magnification of a portion of the image area shown in FIG. 10.

FIGS. 10 and 11 illustrate a fifth preferred embodiment of the present invention, respectively corresponding to FIGS. 4 and 5. In FIGS. 10 and 11, elements corresponding to those shown in FIGS. 4 and 5 are denoted by the same reference numbers, and their repetitive description will be omitted.

The preferred embodiment shown in FIG. 10 has a feature in that each of the printing-direction walls 15 has a plurality of printing-direction cuts 22 formed therein so that the substantially perpendicular wall extends intermittently, having the printing-direction cuts 22 interposed therein. Also, while the printing-direction walls 15 are disposed so as to intersect with the corresponding substantially perpendicular cuts 18, the substantially perpendicular walls 16 are disposed so as to intersect with the corresponding printing-direction cuts 22. Thus, each cell 17 has either of the substantially perpendicular cut 18 and the printing-direction cut 22 at each corner.

The preferred embodiment shown in FIG. 10 has a common feature with the preferred embodiment shown in FIG. 4 as below.

The cells 17(A) lying in the peripheral portion of the image area 13 are formed so as to have smaller open areas than those of the cells 17(B) lying in the central portion of the image area 13. With this structure, the "saddle phenomenon" is unlikely to occur.

Also, as well illustrated in FIG. 11, in the central portion of the image area 13, each of the substantially perpendicular cuts 18 is formed so as to have a gap G1 greater than the width W of each of the printing-direction walls 15 and the substantially perpendicular walls 16. In addition, in the present preferred embodiment, each of the printing-direction cuts 22 is formed so as to have a gap G2 also greater than the width W of the printing-direction wall 15 and the substantially perpendicular wall 16. Even when the conductive paste 12 has a relatively high viscosity, this arrangement allows it to flow easily between the adjacent cells 17 and thus the conductive paste film 9 to have a uniform thickness.

In addition, the image area 13 has the outline groove 21 disposed therein, having a constant width and defining at least a part of its outline. Meanwhile, the outline groove 21 may have different widths in the printing direction and the substantially perpendicular direction from each other. Also, the outline groove 21 is formed along the circumference of the image area 13 in the present preferred embodiment. The presence of such an outline groove 21 improves linearity of the edges of the conductive paste film 9.

Furthermore, all of the plurality of cells 17 are preferably substantially identical in depth. Thus, the thickness of the conductive paste film 9 is easily controlled by the open areas of all the cells 17.

Still furthermore, preferably the present preferred embodiment has a structure as described by referring to FIG. 6, that is, a structure in which the length L of the image area 13 extending in the circumferential direction of the gravure roll 2 is smaller than the nip width N provided by the gravure roll 2 and the impression cylinder 4.

Moreover, in the preferred embodiment shown in FIG. 10, cells 17(C) and cells 17(D) respectively lying on the printing-start side and the printing-end side of the image area 13 are formed so as to have the same open area as each other. This structure contributes to improving uniformity of the thickness of the conductive paste film 9.

Although the present invention has been described in connection with the preferred embodiments illustrated in the figures, a variety of modifications are possible within the scope of the present invention.

For example, although the image area 13 preferably has a substantially rectangular shape in the preferred embodiments illustrated in the figures, the shape of the image area can be arbitrarily changed in accordance with a pattern of the conductive paste film 9 to be formed by gravure printing.

Also, although the substrate sheet 3 is formed by the ceramic green sheet 8 lined with the carrier film 10, and the conductive paste films 9 are formed on the ceramic green sheet 8 in the preferred embodiments illustrated in the figures, for example, the substrate sheet 3 may be formed only by a resin sheet such as the carrier film 10, and the conductive paste films 9 may be formed on the resin sheet. In this case, the conductive paste films 9 formed on the resin sheet are transferred onto the ceramic green sheet 8 in the subsequent step.

In addition, the paste films formed by gravure printing are the conductive paste films 9 in the preferred embodiments illustrated in the figures, they may be films composed of, for example, paste-like ceramic slurry. To be more specific, for example, in a multilayer-ceramic capacitor, in order to absorb steps generated by the thickness of internal electrodes, step-absorbing ceramic layers are sometimes formed in regions of the capacitor having no steps formed therein, and the present invention is applicable to forming paste films composed of the ceramic slurry so as to provide such ceramic layers.

The present invention is not limited to each of the above-described preferred embodiments, and various modifications are possible within the range described in the claims. An embodiment obtained by appropriately combining technical features disclosed in each of the different preferred embodiments is included in the technical scope of the present invention.

What is claimed is:

1. A photogravure press, with which paste films are formed on a substrate sheet by gravure printing, the photogravure press comprising:
    a gravure roll having image areas on a circumferential surface thereof and having print paste applied thereon so as to form the paste films; and
    an impression cylinder facing the gravure roll having the substrate sheet sandwiched therebetween; wherein
    a printing direction corresponds to a direction in which the gravure roll and impression cylinder rotate;
    in each image area, printing-direction walls extending in substantially the printing direction and perpendicular walls extending substantially perpendicularly to the printing-direction walls are disposed, and a plurality of cells are defined by the printing-direction walls and the perpendicular walls; and
    in order for the adjacent cells to communicate with each other, each of the perpendicular walls has substantially perpendicular cuts formed therein.

2. The photogravure press according to claim 1, wherein the printing-direction walls are disposed so as to extend substantially continuously from the printing-start to the printing end in the image area.

3. The photogravure press according to claim 1, wherein in a central portion of the image area, a gap of each of the perpendicular cuts is greater than the width of each of the printing-direction walls and the perpendicular walls.

4. The photogravure press according to claim 1, wherein the perpendicular cuts which are adjacent to each other in the printing direction, take different positions from each other in the perpendicular direction with respect to the printing direction.

5. The photogravure press according to claim 1, wherein a portion of the plurality of cells lying in the peripheral portion of the image area have smaller open areas than those of another portion of the plurality of cells lying in the central portion of the image area.

6. The photogravure press according to claim 1, wherein each of the printing-direction walls extends continuously in the image area, two kinds of the substantially perpendicular walls are alternately disposed in the printing direction such that one lies in contact with any one of the printing-direction walls and the other lies in contact with the above printing-direction wall, having the corresponding substantially perpendicular cut interposed therebetween, and each cell has the substantially perpendicular cuts at its two corners diagonally opposed to each other.

7. The photogravure press according to claim 6, wherein at least one start-edge groove extending substantially perpendicularly to the printing direction is disposed on the printing-start side of the image area so as to be independent of the cells.

8. The photogravure press according to claim 6, wherein the outermost ones of the printing-direction walls have no perpendicular cuts formed outside thereof.

9. The photogravure press according to claim 1, wherein each of the printing-direction walls has a plurality of printing-direction cuts formed therein so that the perpendicular wall extends intermittently, having the printing-direction cuts interposed therein, the printing-direction walls are disposed so as to intersect with the perpendicular cuts, the substantially perpendicular walls are disposed so as to intersect with the printing-direction cuts, and either one of the substantially perpendicular cuts and the printing-direction cuts is disposed at each corner of each of the cells.

10. The photogravure press according to claim 9, wherein a portion of the cells lying on the printing-start side and another portion lying on the printing-end side of the image area are formed so as to have substantially the same open area as each other.

11. The photogravure press according to claim 1, wherein the image area has an outline groove formed therein, having a constant width and defining at least a portion of the outline thereof.

12. The photogravure press according to claim 1, wherein all of the plurality of cells are substantially identical in depth.

13. The photogravure press according to claim 1, wherein the length of the image area extending in the circumferential direction of the gravure roll is smaller than a nip width provided by the gravure roll and the impression cylinder.

14. The photogravure press according to claim 1, used for manufacturing a multilayer-ceramic electronic component, wherein the paste films are patterned layers defining a part of a laminate to be provided in the multilayer-ceramic electronic component.

15. A method for manufacturing a multilayer-ceramic electronic component comprising:

providing the photogravure press according to claim 14, and printing the paste films with the photogravure press.

16. The method for manufacturing a multilayer-ceramic electronic component according to claim 15, wherein the printing step is performed with conductive paste, and the paste film is a conductive paste film to define an internal electrode.

17. The method for manufacturing a multilayer-ceramic electronic component according to claim 16, wherein the printing step is performed on the substrate sheet, and wherein the substrate sheet is a ceramic green sheet.

* * * * *